US010609773B1

(12) United States Patent
Zhou

(10) Patent No.: US 10,609,773 B1
(45) Date of Patent: Mar. 31, 2020

(54) CIRCUIT FOR LED ILLUMINATION DRIVING CURRENT LINEAR ADJUSTMENT AND DIMMING CONTROL

(71) Applicant: Wuxi ORG Microelectronics CO., LTD, Wuxi, Jiangsu (CN)

(72) Inventor: Zhicheng Zhou, Jiangsu (CN)

(73) Assignee: Wuxi ORG Microelectronics CO., LTD, Wuxi (CN)

( * ) Notice: Subject to any disclaimer, the term of this patent is extended or adjusted under 35 U.S.C. 154(b) by 0 days.

(21) Appl. No.: 16/504,254

(22) Filed: Jul. 6, 2019

(30) Foreign Application Priority Data

Mar. 7, 2019 (CN) .......................... 2019 1 0170221

(51) Int. Cl.
*H05B 33/00* (2006.01)
*H05B 33/08* (2020.01)

(52) U.S. Cl.
CPC ..... *H05B 33/0812* (2013.01); *H05B 33/0845* (2013.01)

(58) Field of Classification Search
CPC ............ H05B 33/0815; H05B 33/0845; H05B 33/083; H05B 33/0809; H05B 33/0827; H05B 33/089; H05B 33/0857; H05B 33/0812; H05B 33/0896; H05B 39/044; H05B 33/0824; H05B 33/0851; H05B 33/0887; H05B 37/0272; H05B 33/0818; H05B 37/02; H05B 39/048; H05B 41/3924; H05B 33/0848; H05B 33/0872; H05B 37/0281; H05B 37/029; H05B 41/3925

See application file for complete search history.

(56) References Cited

U.S. PATENT DOCUMENTS 10,149,357 B2   12/2018   Lynch
2012/0081009 A1*  4/2012  Shteynberg .......... H05B 33/083
                                                    315/122

FOREIGN PATENT DOCUMENTS

CN    103929845 B    6/2016
CN    108966430 A    12/2018

* cited by examiner

*Primary Examiner* — Monica C King
(74) *Attorney, Agent, or Firm* — Wayne & Ken, LLC; Tony Hom

(57) ABSTRACT

The invention provides a circuit for LED illumination driving current linear adjustment and dimming control. The circuit for LED illumination driving current linear adjustment and dimming control includes AC power supply module, LED module, drive IC, dimming control module and linear current adjustment Module. The linear current adjustment module may control to reduce current flowing through LED module when input voltage is increased, to achieve balance of input power and improve linear adjustment rate thereof; and the dimming control module may alter the change of an internal reference voltage of the drive IC by external input voltage change, thereby realizing the change of the LED module current, cooperating with a holding current driving part, opening and closing a path for the holding current; therefore, the circuit can be applied to triac dimming applications, and the structure is compatible with 0-10V and PWM driving, thereby improving applicability.

7 Claims, 3 Drawing Sheets

CIRCUIT FOR LED ILLUMINATION DRIVING CURRENT LINEAR ADJUSTMENT AND DIMMING CONTROL

CROSS-REFERENCE TO RELATED APPLICATIONS

This application claims the benefit of priority from Chinese Patent Application No. CN201910170221.6, filed on Mar. 7, 2019. The content of the aforementioned application, including any intervening amendments thereto, is incorporated herein by reference in its entirety.

TECHNICAL FIELD

The present invention relates to a circuit for LED illumination driving current linear adjustment and dimming control.

BACKGROUND OF THE PRESENT INVENTION

In the industry, for linear LED illumination driving, attention is basically paid to the control of the bead current only. When combined with a triac dimmer, a dimming control IC is additionally needed for assistance, which means not only complicated structure, but also increased cost. In addition, when voltage of an external power supply fluctuates and rises, LED beads and driver IC will suffer high voltage impact, which will cause damage to the device and reduce circuit reliability.

SUMMARY OF THE PRESENT INVENTION

The present invention is intended to solve at least one of the above technical problems or at least provide a useful commercial choice. Therefore, the object of the present invention is to provide a circuit for LED illumination driving current linear adjustment and dimming control, which includes an AC power supply module, an LED module, a drive IC, a dimming control module, and a linear current adjustment module. The linear current adjustment module may control to reduce a current flowing through the LED module when the input voltage is increased, to achieve a balance of input power and improve a linear adjustment rate thereof; and the dimming control module may alter the change of an internal reference voltage of the drive IC by external input voltage change, thereby realizing the change of the LED module current, cooperating with a holding current driving part, opening and closing a path for the holding current; therefore, the circuit can be applied to triac dimming applications with good compatibility, and the structure is compatible with 0-10V and Pulse Width Modulation (PWM) driving, thereby improving applicability.

The circuit for LED illumination driving current linear adjustment and dimming control according to the present invention includes: an AC power supply module 10 for providing an input voltage; an LED module 20 connected to the AC power supply module 10, a drive IC 30, and a linear current adjustment module 40, where the LED module 20 includes at least one LED bead string; the drive IC 30, connected to the AC power supply module 10, the LED module 20, a dimming control module 35, and the linear current adjustment module 40, where the drive IC is configured for dimming and constant current control; the dimming control module 35, connected to a first node 110 (DIM pin of the drive IC), where the dimming control module is configured to generate a reference voltage as an input to a dimming control DIM pin of the drive IC; the linear current adjusting module 40, connected to the drive IC 30 and the LED module 20, where the linear current adjusting module 40 is configured for controlling to reduce the current flowing through the LED module when the input voltage is increased, thereby achieving power balance.

In addition, the circuit for LED illumination driving current linear adjustment and dimming control according to the present invention may further have the following additional technical features:

The LED module includes at least one LED bead string.

The linear current adjustment module 40 includes a first resistor unit and a MOS transistor; the first resistor unit comprises a first resistor and a second resistor connected in series; the first resistor R7 is connected to a drain of the MOS transistor at a second node 120 as a connection point; the first resistor R7 is connected to the second resistor R8 at a third node 130 (SET pin of the drive IC) as a connection point; the second resistor R8 and a first capacitor C8 are connected in parallel; the first capacitor C8, after being connected with the second resistor R8 in parallel, is connected to a source of the MOS transistor at a fourth node 140 as a connection point; the fourth node 140 is connected to a third resistor R6; and the third resistor R6 is grounded.

An inverting input terminal of an operational amplifier inside the drive IC 30 is connected to the third node 130, and an output terminal of the operational amplifier inside the drive IC is connected to a gate of the MOS transistor.

The dimming control module 35 includes an RC voltage-dividing resistor unit. The RC voltage-dividing resistor unit includes a fourth resistor R4 and a fifth resistor R5 connected in series as well as a second capacitor C2 connected with the fifth resistor in parallel. The fourth resistor is connected to the fifth resistor at a first node 110 as the connection node. When the value of the input voltage at the first node 110 is greater than or equal to the first reference voltage, the reference voltage $V_{REF}$ of the drive IC is at a certain value; when the value of the input voltage is less than the first reference voltage, the reference voltage $V_{REF}$ of the drive IC is linear to the input voltage.

A rectifier bridge is further disposed between the AC power supply module and the LED module, and the rectifier bridge is connected to a live line and a neutral line of the AC power supply module.

The dimming control module includes an RC voltage-dividing resistor unit. The RC voltage-dividing resistor unit includes a fourth resistor R4 and a fifth resistor R5 connected in series, and the fifth resistor is connected in parallel with the second capacitor C2. The fifth resistor R5 is grounded.

The circuit for LED illumination driving current linear adjustment and dimming control further includes a triac dimmer disposed between the live line and the rectifier bridge. The drive IC further provides a holding current for the triac dimmer. The AC power supply module 10 is connected to the drive IC 30, which drives a CS pin 80 inside the drive IC, and a resistor R3 is connected to the position of the AC power supply module 10 in series, dedicated for providing the holding current of the triac dimmer, so to improve the dimming compatibility.

Some of the additional aspects and advantages of the invention will be set forth in the following description, and some will be apparent from the following description or be known from practice of the invention.

BRIEF DESCRIPTION OF THE DRAWINGS

The forgoing and/or additional aspects and advantages of the present invention will become apparent and readily understood from the description of the embodiments of the invention in connection with the following drawings, in which.

DETAILED DESCRIPTION OF THE PRESENT INVENTION

Figure 1:
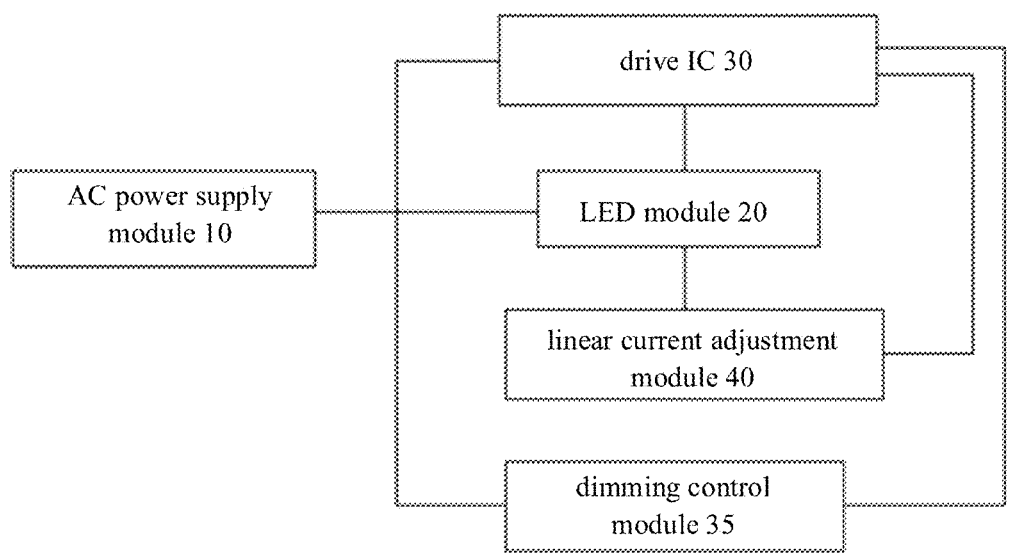
FIG. 1 is a structural block diagram of a circuit for LED illumination driving current linear adjustment and dimming control according to an embodiment of the present invention.

The embodiments of the present invention are described in detail below, and the examples of the embodiments are illustrated in the drawings, in which the same or similar reference numerals are used to refer to the same or similar elements or elements having the same or similar functions. The embodiments described below with reference to the drawings are exemplary and are intended to be illustrative of the invention rather than to be construed as limitation to the invention.

Figure 2:
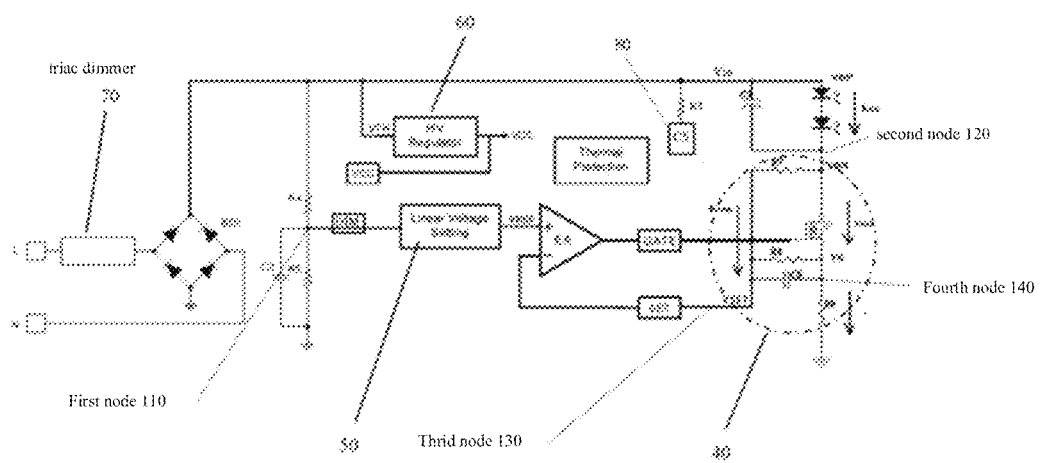
FIG. 2 is a circuit diagram of an LED illumination driving current linear adjustment circuit according to an embodiment of the present invention.

FIG. 1 is a structural block diagram of a circuit for LED illumination driving current linear adjustment and dimming control according to an embodiment of the present invention; and FIG. 2 is a circuit diagram of an LED illumination driving current linear adjustment circuit according to an embodiment of the present invention. Referring to FIGS. 1 to 2, the present invention provides a circuit for LED illumination driving current linear adjustment and dimming control, in which a linear current adjustment module can control to reduce the current flowing through the LED module, to reach an input power balance and further increase linear adjustment rate; a dimming control module can alter the change of an internal reference voltage of the drive IC by external input voltage change, thereby realizing the change of the LED module current, cooperating with a holding current driving part, opening and closing a path for the holding current; therefore, the circuit can be applied to triac dimming applications, and the structure is compatible with 0-10V and Pulse Width Modulation (PWM) driving, thereby improving applicability.

The circuit for LED illumination driving current linear adjustment and dimming control includes an AC power supply module 10, an LED module 20, a drive IC 30, a linear current adjustment module 40, and a dimming control 35.

The AC power supply module 10 is configured to provide AC to the circuit. In the embodiment, the AC power supply module 10 provides for the circuit an alternating input voltage of 120 V or 230 V, and the rectified DC voltage is labeled Vin; in other embodiments, the AC power supply module 10 can provide for the circuit an alternating input voltage of 120V or 230V or other different values.

The LED module 20 is connected to the AC power supply module 10, the drive IC 30 and the linear current adjustment module 40. The LED module 20 is composed of one or more LED bead strings. After receiving the input voltage provided by the AC power supply module 10, the LED module 20 can lighten the LED beads for operation.

The AC power supply module 10 is connected to the LED module 20, the dimming control module 35, and the drive IC 30. The drive IC 30 is connected to the dimming control module 35 through a first node 110, and the dimming control module 35 is configured to generate a reference voltage; in other words, the dimming control module 35 is connected to the AC power supply module 10, and the dimming control module 35 is configured to generate an input voltage $V_{DIM}$.

The linear current adjustment module 40 is connected to both the drive IC 30 and the LED module 20, for controlling to reduce the current flowing through the LED module 20 when the input voltage is increased, so as to achieve balance of the input power and increase linear adjustment rate; the dimming control module 30 can change an internal reference voltage of the drive IC by external input voltage change, thereby realizing the change of the LED module current, cooperating with a holding current driving part 80, opening and closing a path for the holding current; therefore, the circuit of good compatibility can be applied to triac dimming applications, and is compatible with 0-10V and Pulse Width Modulation (PWM) driving, thereby improving applicability.

In a specific implementation, referring to FIG. 2, the linear current adjustment module 40 includes a first resistor unit and a MOS transistor Q1. The first resistor unit includes a first resistor R7 and a second resistor R8 connected in series, and the second resistor R8 is connected with the first capacitor C8 in parallel. A connection point where the first capacitor C8 is connected to the MOS transistor Q1 is a fourth node 140. The fourth node 140 is connected to a third resistor R6, and the third resistor R6 is grounded.

In a specific implementation, referring to FIG. 2, an inverting input terminal of an operational amplifier EA inside the drive IC 30 is connected to a third node, and an output terminal of the operational amplifier EA inside the drive IC 30 is connected to a gate of the MOS transistor Q1.

In a specific implementation, referring to FIG. 2, there is a reference voltage $V_{SET}$ (power linear feedback and bead constant current regulation) at the inverting input terminal of the operational amplifier EA inside the drive IC 30 and the first resistor R7. The dimming control module 35 provides the input voltage $V_{DIM}$ at the first node 110. The value of the reference voltage $V_{SET}$ is less than the value of the driving voltage $V_{REF}$ and is related to the value of the input voltage $V_{DIM}$. Specifically, when the value of the input voltage $V_{DIM}$ is greater than or equal to the first reference voltage, the voltage $V_{SET}$, affected by referring to $V_{REF}$, is adjusted to a certain value (being adjusted to the same value of $V_{REF}$ after feedback); when the value of the input voltage $V_{DIM}$ is less than the first reference voltage, the reference voltage $V_{SET}$ is linear to the input voltage $V_{DIM}$. In an embodiment of the invention, the first reference voltage is set to 1.5V; when the input voltage $V_{DIM}$>1.5V, the reference voltage $V_{SET}$=0.75V; when the input voltage $V_{DIM}$<1.5V, the reference voltage $V_{SET}$ and the input voltage $V_{DIM}$ is in a linear relationship: $V_{SET}=V_{DIM}/2$.

In a specific implementation, referring to FIG. 2, a rectifier bridge BD1 is further provided between the AC power supply module 10 and the LED module 20, and the rectifier bridge BD1 is connected to a live line (denoted as L) and a neutral line (denoted as N) of the AC power supply module 10.

In a specific implementation, referring to FIG. 2, the dimming control module 35 is further provided with an RC voltage-dividing resistor unit, and the RC voltage-dividing resistor unit includes a fourth resistor R4 and a fifth resistor R5 in series. The fifth resistor R5 and the second capacitor C2 are connected in parallel, and the fifth resistor R5 is grounded. The connection point where the fourth resistor is connected with the fifth resistor is a first node 110, and the dimming control module 35 is connected to the drive IC 30 through the first node 110.

In a specific implementation, referring to FIG. 2, the circuit for LED illumination driving current linear adjustment and dimming control further includes a triac dimmer 70, and the triac dimmer 70 is disposed between the live line L and the rectifier bridge BD1.

The operation principle of the circuit for LED illumination driving current linear adjustment and dimming control of the present invention will be described below with reference to a specific embodiment. Referring to FIG. 2, when the first resistor R7 is disconnected from the circuit, the output terminal OUT of the power amplifier EA, the MOS transistor Q1, the second resistor R8, the third resistor R6 and the reference voltage $V_{REF}$ form a negative feedback loop. At this time, as long as MOS transistor Q1 works normally, the reference voltage $V_{SET}$ will be locked at 0.75V, and no current flows through the second resistor R8, so the reference voltage $V_{REF}=V6=0.75V$ (to achieve constant current control for the beads), where V6 is the voltage over the third resistor R6.  (1)

$I_{SENSE}=V6/R6$, where $I_{SENSE}$ is the current flowing through the third resistor R6,  (2)

When the first resistor R7 is turned on in the circuit, the negative feedback loop formed by the output terminal OUT of the operational amplifier EA, the MOS transistor Q1, the second resistor R8, the third resistor R6 and the reference voltage $V_{REF}$ still exists, therefore $V_{REF}=0.75V$. However, due to the first resistor R7, there will be a current $I_{COMP}$ flowing through the first resistor R7 and the second resistor R8, so $I_{COMP}=(VDN-V_{REF})/R7=(VDN-0.75)/R7$, where VDN is the voltage at the negative terminal of the LED module 20,  (3)

$V6=V_{REF}-I_{COMP}*R8=0.75-[(VDN-0.75)/R7]*R8$  (4)

$$V6 = V_{REF} - \frac{(VDN-VREF)}{R7} \times R8 = V_{REF}\left(1+\frac{R8}{R7}\right) - \frac{R8}{R7} \times V_{DN} \quad (5)$$

From Equation (1) and Equation (5):

$$I_{SENSE} = \frac{VREF}{R6}\left(1+\frac{R8}{R7}\right) - \frac{R8}{R6 \times R7} \times V_{DN} \quad (6)$$

Since $$\frac{VREF}{R6}\left(1+\frac{R8}{R7}\right), \frac{R8}{R6 \times R7}$$

are both fixed values, the equation 6 satisfies the function y=C−mχ,
where $$C = \frac{VREF}{R6}\left(1+\frac{R8}{R7}\right), m = \frac{R8}{R6 \times R7}$$

(being linear adjustment slope).

VDN=VDP−VLED, where VDP is the input voltage of the LED module 20, and VLED is the voltage flowing through the LED module 20. It can be seen that the higher the input voltage Vin is, the larger the voltage difference between VDP and VDN is, so that the larger the $I_{COMP}$ is, the lower V6 is. Hence, the values of $I_{SENSE}$ and $I_{LED}$ are reduced, where $I_{LED}$ is the current flowing through the LED module 20.

Figure 3:
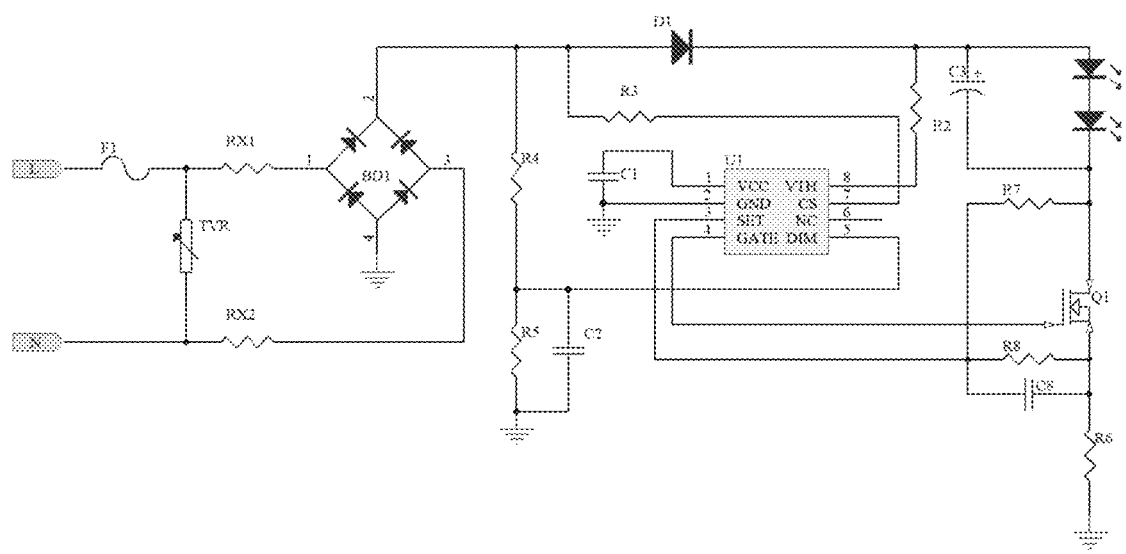
FIG. 3 is an application circuit diagram of an LED illumination driving current linear adjustment circuit according to an embodiment of the present invention.

Referring to FIG. 3, given a preset AC input of 110V, the voltage Vf flowing through the LED module 20 is 127V, and the drive IC 30 uses ORG IC U1. Then, the resistances of the first resistor R7 and the second resistor R8 are estimated as follows:

$V_F$ is the LED output voltage, $V_{P1}$ is peak value of the default AC voltage, and $V_{P2}$ is the peak value obtained by multiplying the default AC voltage by 110%.

$$K1 \times \left[1.02 - (Vp1-Vf)\times\frac{R8}{R7}\right] = K2 \times \left[1.02 - (Vp2-Vf)\times\frac{R8}{R7}\right] \quad (7)$$

$$K1 = \frac{\Pi}{2} - \frac{Vf}{Vp1} - \frac{1}{6}\times\left(\frac{Vf}{Vp1}\right)^3 \quad (8)$$

$$K2 = \frac{\Pi}{2} - \frac{Vf}{Vp2} - \frac{1}{6}\times\left(\frac{Vf}{Vp2}\right)^3 \quad (9)$$

The relationship between the first resistance R7 and the second resistance R8 can be obtained from the above equations, and the second resistance R8 can be obtained by specifying the first resistance R7.

$$Vp1 = 110 \times \sqrt{2} = 156$$

$$Vp2 = 110 \times 1.1 \times \sqrt{2} = 171$$

$$K1 = \frac{\Pi}{2} - \frac{127}{156} - \frac{1}{6}\times\left(\frac{127}{156}\right)^3 = 0.667$$

$$K2 = \frac{\Pi}{2} - \frac{127}{171} - \frac{1}{6}\times\left(\frac{127}{171}\right)^3 = 0.760$$

$$0.667 \times \left[1.02 - (156-127)\times\frac{R8}{R7}\right] = 0.760 \times \left[1.02 - (171-127)\times\frac{R8}{R7}\right]$$

Specifying R7=100KΩ, it can be get that R8=671Ω, and a common resistance 680Ω may be chosen.
And $$V6 = V_{REF}\left(1+\frac{R8}{R7}\right) - \frac{R8}{R7} \times V_{DN},$$

so V6 also satisfies the relationship of the function $$y = C1 - m1\chi, \ C1 = V_{REF}\left(1+\frac{R8}{R7}\right), \ m1 = \frac{R8}{R7},$$

$$\frac{C1}{m1} = \frac{VREF\left(1+\frac{R8}{R7}\right)}{\frac{R8}{R7}} = VREF\left(1+\frac{R7}{R8}\right) = 0.8\left(1+\frac{100\times100}{671}\right) = 120,$$

therefore the linear adjustable voltage range VDN is 0~120V.

VDN=VDP|VLED, VDP=VDN+VLED, so the input voltage range VDP is 127~247V. But 247V is not feasible because of the limited withstand voltage of the beads. Although the VDN is at 120V, the bead current is already halved when the voltage rises to a half (60V) of 120V, and the brightness of the beads is much worse, so the operation range needs to be set.

$$\frac{R7}{R8} = \left(\frac{\frac{C}{m}}{VREF} - 1\right),$$

and the ratio can be estimated from the linear adjustment voltage range VDN.

Since m=R8/R7, adjustment depth of $I_{SENSE}$ may be determined from this ratio. The larger the second resistance R8 is, the larger the slope is, and the larger and deeper the adjustment depth is.

In a specific implementation, the circuit for LED illumination driving current linear adjustment of the present invention has the function of LED short-circuit protection in addition to the high-low voltage compensation function. Specifically, when the LED module 20 is short-circuited, the reference voltage VDN is instantaneously pulled high, and the drive IC 30 sends a signal to turn off the MOS transistor Q1. At this time, only a small current flows through the first resistor R7, the second resistor R8 and the third resistor R6, thereby preventing the MOS transistor Q1 from being burned.

Referring to FIG. 2, in the LED illumination driving current linear adjustment and dimming control module 35 of the present invention, the drive IC 30 can generate a constant current, and the current can be set by changing the resistance between the SET pin and the GND pin. At the same time, the reference potential of the SET pin is changed by the voltage change of the DIM pin, thereby achieving the purpose of altering the change of LED current.

The circuit for LED illumination driving current linear adjustment and dimming control according to the embodiment of the invention can also be applied in the triac dimming application mode. Since the voltage at the SET pin changes with the voltage at the DIM pin, the channel CS will be turned on when the voltage at the SET pin is lower than 0.4V, and an additional bleeder current will be provided to increase the compatibility of the triac dimming. At the same time, when the voltage at the DIM pin is lower than 1.5V, there is a certain linear proportional relationship between the voltage at the SET pin and the voltage at the DIM pin; the smoothness of the LED current change of the triac dimming is thus assured, and the dimming experience can be improved.

The circuit for LED illumination driving current linear adjustment and dimming control according to the embodiment of the invention can also be applied in 0-10V dimming application. Specifically, since there is a certain linear proportional relationship between the reference potential at the SET pin and the DIM pin when the voltage at the DIM pin is lower than 1.5V, this feature is used to complete the 0-10V application by setting the fourth resistor R4, the fifth resistor R5, and the second capacitor C2 in the RC voltage-dividing resistor unit. By setting the values of the fourth resistance R4, the fifth resistance R5 and the second capacitance C2, the input voltage of the DIM pin is about 1.5V, and the calculation formula is VIN*R4/(R4+R5)=1.5, where $V_{IN}$ is set according to the maximum 10V.

The circuit 35 for LED illumination driving current linear adjustment and dimming control according to the embodiment of the invention can also be applied in a PWM dimming application. Design is performed by taking the highest voltage of the PWM system as the reference, and the ratio of R4/R5 can be roughly calculated according to the above setting and according to the calculation formula VPWM*R5/(R4+R5)=1.5 of the fourth resistor R4, the fifth resistor R5 and the second capacitor C2, thereby completing the PWM dimming application.

The circuit 35 for LED illumination driving current linear adjustment and dimming control according to the embodiment of the invention can achieve good linear adjustment by using the feedback of the first resistor R7 and the second resistor R8 in high voltage feedback control application; in various dimming applications, due to the voltage level regulation of the DIM pin, better accuracy may be achieved in dimming applications, and the additional triac dimming bleeder current may improve the compatibility of dimming, thereby greatly improving the efficiency of IC drive.

In the description of this specification, the description with reference to the terms of "one embodiment", "some embodiments", "example", "specific example", or "some examples" and the like means that specific features, structures, materials, or characteristics described in connection with the embodiments or examples are included in at least one embodiment or example of the invention. In this specification, the exemplary expression of the above terms does not necessarily refer to the same embodiment or example. Furthermore, the specific features, structures, materials, or characteristics described may be combined in a suitable manner in any one or more embodiments or examples.

Although embodiments of the present invention have been set forth and described above, it is understood that the foregoing embodiments are illustrative and are not meant to limit the present invention. Changes, modifications, alterations and variations of the above-described embodiments are possible for those skilled in the art within the scope of the invention without departing from the principle and purpose of the invention.

What is claimed is:

1. A circuit for LED illumination driving current linear adjustment and dimming control, comprising:
    an AC power supply module configured to provide an input voltage;
    an LED module connected to the AC power supply module, a drive IC, and a linear current adjustment module, wherein the LED module comprises at least one LED bead string;
    the drive IC, connected to the AC power supply module, the LED module, a dimming control module, and the linear current adjustment module, wherein the drive IC is configured for dimming and constant current control;
    the linear current adjustment module, connected to each of the drive IC and the LED module, wherein the linear current adjustment module is configured for controlling to reduce a current flowing through the LED module when the input voltage is increased, thereby achieving a power balance; and
    the dimming control module, connected to the AC power supply module and the drive IC, wherein the dimming control module is operative to adjust a reference voltage of the linear current adjustment module to change the current of the LED module,
    wherein the linear current adjustment module comprises a first resistor unit and a MOS transistor; the first resistor unit comprises a first resistor and a second resistor connected in series; the first resistor is connected to a drain of the MOS transistor at a second node as a connection point the first resistor is connected to the second resistor at a third node as a connection point the second resistor and a first capacitor are connected in parallel; the first capacitor is connected to a source of the MOS transistor at a fourth node as a connection point the fourth node is connected to a third resistor; and the third resistor is grounded.

2. The circuit for LED illumination driving current linear adjustment and dimming control according to claim 1, wherein the LED module comprises at least one group of LED bead strings.

3. The circuit for LED illumination driving current linear adjustment and dimming control according to claim 1, wherein an inverting input terminal of an operational amplifier inside the drive IC is connected to the third node, and an output terminal of the operational amplifier inside the drive IC is connected to a gate of the MOS transistor.

4. The circuit for LED illumination driving current linear adjustment and dimming control according to claim 1, wherein when a value of the input voltage is greater than or equal to a first reference voltage, a reference voltage of the drive IC is at a certain value; and when the value of the input voltage is less than the first reference voltage, the reference voltage of the drive IC is linear to the input voltage.

5. The circuit for LED illumination driving current linear adjustment and dimming control according to claim 1, wherein a rectifier bridge is further provided between the AC power supply module and the LED module, and the rectifier bridge is connected to a live line and a neutral line of the AC power supply module.

6. The circuit for LED illumination driving current linear adjustment and dimming control according to claim 1, wherein an RC voltage-dividing resistor unit is further provided between the dimming control module and the first node; the RC voltage-dividing resistor unit comprises a fourth resistor and a fifth resistor connected in series; the fifth resistor is connected with a second capacitor in parallel; and the fifth resistor is grounded.

7. The circuit for LED illumination driving current linear adjustment and dimming control according to claim 5, further comprising a triac regulator, wherein the triac regulator is provided between the live line and the rectifier bridge.

* * * * *